US011693436B2

(12) United States Patent
Ollander et al.

(10) Patent No.: US 11,693,436 B2
(45) Date of Patent: Jul. 4, 2023

(54) CONTROL SYSTEMS FOR VALVE ACTUATORS, VALVE ACTUATORS AND RELATED SYSTEMS AND METHODS

(71) Applicant: Flowserve Management Company, Irving, TX (US)

(72) Inventors: Mark D. Ollander, Forest, VA (US); Daniel E. Carlson, Rustburg, VA (US); Michael Adam Rumore, Lynchburg, VA (US)

(73) Assignee: FLOWSERVE PTE. LTD., Singapore (SG)

( * ) Notice: Subject to any disclaimer, the term of this patent is extended or adjusted under 35 U.S.C. 154(b) by 305 days.

(21) Appl. No.: 17/033,038

(22) Filed: Sep. 25, 2020

(65) Prior Publication Data

US 2021/0011502 A1  Jan. 14, 2021

Related U.S. Application Data

(63) Continuation of application No. 16/388,656, filed on Apr. 18, 2019, now Pat. No. 10,976,757.

(51) Int. Cl.
  *G05D 17/02* (2006.01)
  *G05D 7/06* (2006.01)
  *F16K 31/60* (2006.01)

(52) U.S. Cl.
  CPC .......... *G05D 17/02* (2013.01); *G05D 7/0635* (2013.01); *F16K 31/60* (2013.01)

(58) Field of Classification Search
  CPC ............................. G05D 7/0635; F16K 31/60

USPC .................................................. 137/551–557
See application file for complete search history.

(56) References Cited

U.S. PATENT DOCUMENTS

| | | |
|---|---|---|
| 4,649,803 A | 3/1987 | Abel |
| 4,650,151 A | 3/1987 | McIntyre |
| 4,761,608 A | 8/1988 | Franklin et al. |
| 4,836,243 A | 6/1989 | Ferrell |
| 5,157,956 A | 10/1992 | Isaji et al. |
| 5,431,086 A | 7/1995 | Morita et al. |
| 5,654,885 A | 8/1997 | Mayhew et al. |
| 5,682,922 A | 11/1997 | Galazin et al. |
| 5,848,609 A | 12/1998 | Marchesseault et al. |
| 7,064,508 B2 | 6/2006 | Keefover et al. |
| 7,344,297 B2 | 3/2008 | Urquhart |
| 7,855,525 B2 | 12/2010 | Sanders et al. |
| 8,086,329 B2 | 12/2011 | Keefover et al. |
| 8,141,844 B2 | 3/2012 | Crivelli et al. |
| 8,190,297 B2 * | 5/2012 | Gunnarsson ............ F02B 39/00 700/282 |
| 8,240,635 B2 | 8/2012 | Crivelli et al. |
| 8,585,012 B2 | 11/2013 | Labataille et al. |

(Continued)

FOREIGN PATENT DOCUMENTS

| | | |
|---|---|---|
| CN | 1890459 A | 1/2007 |
| JP | 62-193530 A | 8/1987 |

(Continued)

*Primary Examiner* — Angelisa L. Hicks
(74) *Attorney, Agent, or Firm* — PCFB LLC

(57) ABSTRACT

Valve systems and related methods include valve actuators and control systems configured to monitor at least one characteristic of the valve system during movement of a valve element to a position in the valve system and to determine a drift of the position based on the monitored at least one characteristic of the valve system.

19 Claims, 5 Drawing Sheets

(56) References Cited

U.S. PATENT DOCUMENTS

| | | |
|---|---|---|
| 8,740,182 B2 | 6/2014 | Crivelli et al. |
| 9,273,597 B2 | 3/2016 | Kokotovic et al. |
| 9,435,220 B2 | 9/2016 | Alajbegovic |
| 9,562,537 B2 | 2/2017 | Heidingsfelder et al. |
| 2004/0103880 A1* | 6/2004 | Hirayama ............... G01F 1/72 73/114.37 |
| 2004/0193357 A1 | 9/2004 | Kasbauer et al. |
| 2005/0080495 A1 | 4/2005 | Tessier et al. |
| 2005/0286340 A1 | 12/2005 | Urquhart |
| 2009/0132185 A1* | 5/2009 | Furuse ............... G01M 3/3263 702/51 |
| 2009/0140184 A1 | 6/2009 | Crivelli et al. |
| 2009/0140185 A1 | 6/2009 | Crivelli et al. |
| 2011/0100469 A1 | 5/2011 | Beeston et al. |
| 2011/0260083 A1 | 10/2011 | Labataille et al. |
| 2012/0150356 A1 | 6/2012 | Crivelli et al. |
| 2015/0149100 A1 | 5/2015 | Eisenbeis et al. |
| 2018/0259983 A1 | 9/2018 | Madlener et al. |
| 2018/0356845 A1 | 12/2018 | Yasuda et al. |

FOREIGN PATENT DOCUMENTS

| | | |
|---|---|---|
| JP | 03-057853 A | 3/1991 |
| JP | 07-217760 A | 8/1995 |
| JP | 07-331723 A | 12/1995 |
| JP | 09-298898 A | 11/1997 |
| JP | 09-317570 A | 12/1997 |
| JP | 11-280526 A | 10/1999 |
| JP | 2001-099347 A | 4/2001 |
| JP | 2004-150400 A | 5/2004 |
| JP | 2008-019957 A | 1/2008 |
| JP | 2011-207876 A | 10/2011 |

* cited by examiner

CONTROL SYSTEMS FOR VALVE ACTUATORS, VALVE ACTUATORS AND RELATED SYSTEMS AND METHODS

RELATED SYSTEMS AND METHODS

This application is a continuation of U.S. patent application Ser. No. 16/388,656, filed Apr. 18, 2019, for "CONTROL SYSTEMS FOR VALVE ACTUATORS, VALVE ACTUATORS AND RELATED SYSTEMS AND METHODS," the disclosure of which is hereby incorporated herein in its entirety by this reference.

TECHNICAL FIELD

The present disclosure relates generally to valve actuators, and more particularly, to control systems for valve actuators and related systems and methods.

BACKGROUND

Valves include devices for both liquids and gases. Valve actuators are used to operate valves and are manufactured in numerous shapes, sizes, forms, and have a wide variety of utilities. Valve actuators may be manually driven, electrically driven, operated by fluid pressure in which the shaft is connected directly or indirectly to a fluid operated piston, or other hydraulic systems. For example, the valve actuator may be manually driven, operated by fluid pressure in which the shaft is connected directly or indirectly to a fluid operated piston, or be driven by an electric motor or through electro-hydraulic or electro-fluid methods. Conventional valve actuators comprise an electrically driven input shaft, which may be rotatable at relatively high speeds with relatively low torque. The input shaft may, through reducing gears such as a worm gear or a helical screw thread and nut, rotate a relatively high torque, low speed output shaft.

Actuators are often sized such that they can provide more torque than necessary to fully seat a given valve. It may be desirable to determine the torque generated by the output shaft or drive sleeve of a valve actuator. For example, when a valve is approaching a fully closed and/or fully seated position, the torque required to operate the valve may be considerably higher.

Actuators generally need to control or limit the amount of torque that can be applied to the load in a manner that is appropriate for various operating modes in a given application. If a torque threshold is exceeded, then a torque sensor may disengage or cease operation of the motor or otherwise cease the operation of the actuator. The torque threshold may be fixed by the user at startup and may remain fixed until physically changed by the user. In such a situation, the valve actuator may cease operation without completing movement of the valve, which may result with the valve not in a fully seated or closed position.

In addition to setting torque thresholds, the actuator may be configured (e.g., initially configured) to move a valve element to a selected fully seated or closed position of the valve. However, the fully seated or closed position of the valve may vary over time due to variation in the operation conditions of the valve assembly, such as, material buildup on the seating surface and/or the valve, wear on the seating surface and/or the valve, or combinations thereof. The drift of the fully seated or closed position of the valve effects the ability of the actuator to ensure that the valve is correctly positioned in the fully seated or closed position.

BRIEF SUMMARY

In some embodiments, the present disclosure includes a valve system comprising a valve actuator for controlling a position of a valve element in a valve in order to control flow through at least a portion of the valve and a control system for controlling the valve actuator. The control system may be configured to: instruct the valve actuator to move the valve element toward an unobstructed first position in the valve to enable fluid flow through the at least a portion of the valve; instruct the valve actuator to move the valve element to a second position in the valve to reduce or increase fluid flow through the at least a portion of the valve; monitor at least one characteristic of the valve system during movement of the valve element to the second position; and determine a drift of the second position based on the monitored at least one characteristic of the valve system.

In additional embodiments, the present disclosure includes a valve system comprising a valve actuator for controlling a position of a valve element in a valve in order to control flow through at least a portion of the valve and a control system for controlling the valve actuator. The control system may be configured to: instruct the valve actuator to move the valve element to a target position from an initial position in the valve to reduce or increase fluid flow through the at least a portion of the valve; monitor at least one characteristic of the valve system during movement of the valve element to the target position; and detect a location of the target position based on the monitored at least one characteristic of the valve system. The control system may be further configured to at least one of: move the valve element into contact with a seat of the valve system in the target position and then to force the valve element into the seat until a selected value of torque in the valve actuator is reached; or substantially maintain a location of the open position while actively adjusting the location of the target position based on the monitored at least one characteristic of the valve system each time the valve element is moved to the target position.

In yet additional embodiments, the present disclosure includes a method of operating a control system of a valve actuator. The method includes moving a valve element with the valve actuator to a closed position to substantially inhibit fluid flow through at least a portion of the valve; monitoring at least one characteristic of the valve system during movement of the valve element to the closed position; determining a drift of the closed position based on the monitored at least one characteristic of the valve system; and at least one of: moving the valve element with the valve actuator toward an open position lacking a hard stop in the valve to enable fluid flow through the at least a portion of the valve; moving the valve element into contact with a seat of the valve system in the closed position and then forcing the valve element into the seat until a selected value of torque in the valve actuator is reached; or substantially maintaining a location of the open position while actively adjusting the location of the closed position based on the monitored at least one characteristic of the valve system each time the valve element is moved to the closed position.

The features, advantages, and various aspects of the present disclosure will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded

DETAILED DESCRIPTION

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Figure 1:
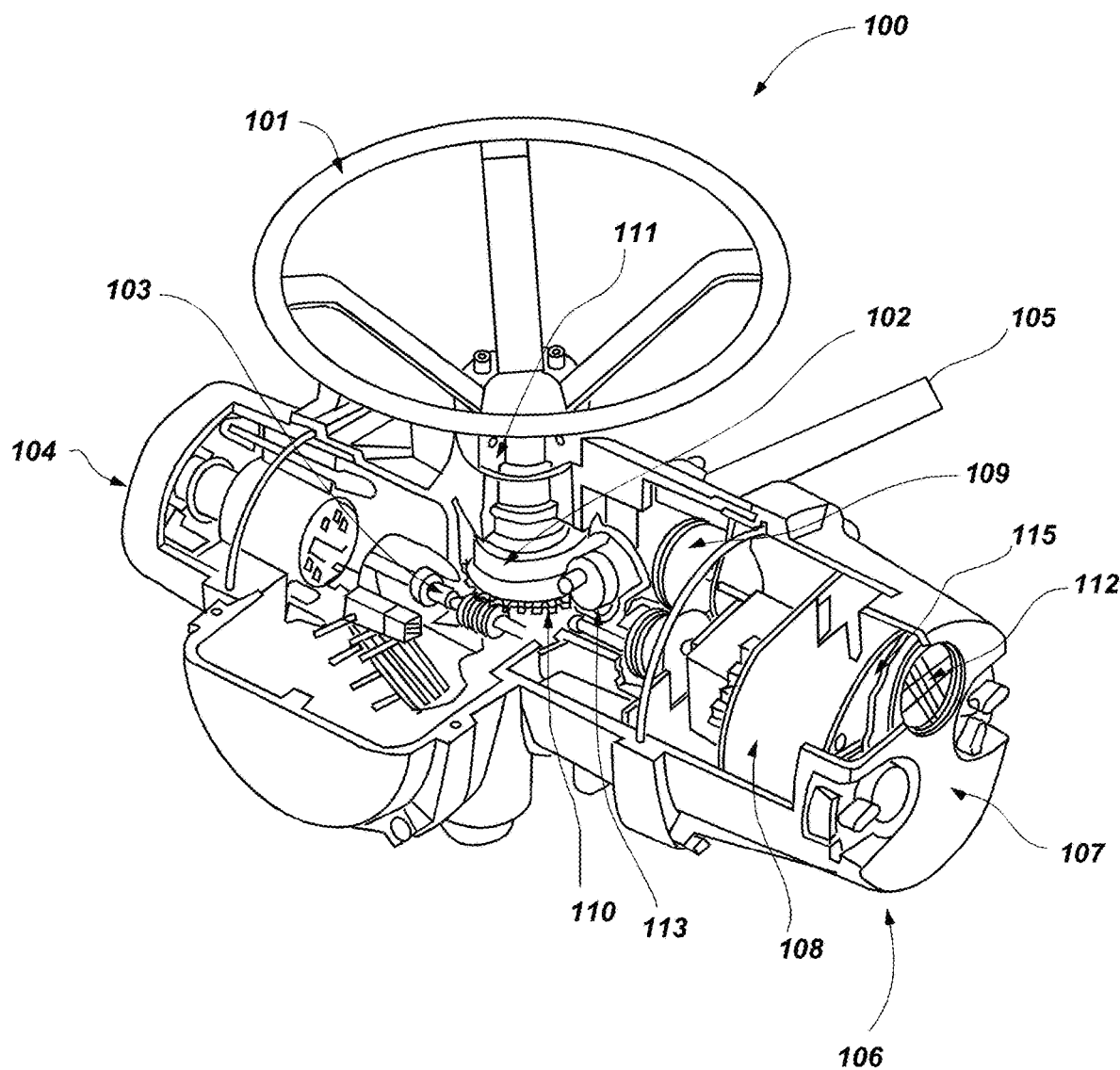
FIG. 1 is a cut-away view of an electrically driven valve actuator.

FIG. 1 illustrates an electrically driven valve actuator 100. FIG. 1 illustrates just one version of an electrically driven valve actuator and is not intended to limit the applicability of the disclosure to any electrically driven or other valve actuator (e.g., a pneumatic actuator, a hydraulic actuator, etc.). Valve actuator 100 includes electric motor 104 coupled to worm shaft 103. Handwheel 101 is connected to handwheel adapter 111. Handwheel adapter 111 is connected to drive sleeve 102. Drive sleeve 102 is connected to valve stem nut (not shown). Worm gear 110 mates with worm shaft 103. Worm gear 110 is also coupled to a valve stem nut, which is able to drive the valve stem of a valve. In FIG. 1, valve actuator 100 is not shown attached to a valve. Operation of either electric motor 104 or handwheel 101 raises or lowers a valve stem. The valve stem is able to travel up and down through the center of handwheel 101. The valve stem may also rotate and either operate a nut in the valve which can either open or close the valve or can directly rotate a valve element to an open or close position (e.g., as in a butterfly, vane, or ball valve).

Valve actuator 100 may include any drive train, hardware, devices, electronics, and/or software utilized in operating a valve. Valve actuator 100 may be designed for any type of valve, including for example, linear, quarter-turn rotary, multi-turn rotary, ball, plug, gate, butterfly, and diaphragm valves. The components of valve actuator 100 may be arranged in any fashion. Handwheel 101 may be oriented to the side of valve actuator 100, as is known in the art.

The drive train encompasses any prime mover, any manual operation mechanism, any disengagement or isolation mechanisms, braking mechanisms, any speed modulation mechanisms, and the mechanisms for attachment to a valve. A drive train may also exclude any of the above elements or also include additional elements. For purposes of illustration only, FIG. 1 shows electric motor 104 as the prime mover and handwheel 101 as the manual operation mechanism. Often, a clutch mechanism will be included so that operation of either electric motor 104 or handwheel 101 does not result in operation of the other. By way of example, a lever 105 and a declutch mechanism 113 can be provided as the disengagement or isolation mechanisms. Numerous clutch and engagement mechanisms are known in the art. Declutch mechanism 113 may be designed to engage or disengage any portion of the drive train of valve actuator 100.

In FIG. 1, the locking and braking mechanism is incorporated in worm shaft 103 and worm gear 110. Instead of, or in addition to, worm gear 110 and worm shaft 103, other gear types or no gears may be used in valve actuator 100. Gear types for valve actuators are often selected based upon the amount of speed reduction, if any, between electric motor 104 and valve stem nut. Hereinafter, when referring to the gears of the drive train of a valve actuator, the example of a worm gear and a worm shaft are primarily utilized. However, it should be understood that the discussion may be applied to any gear. If a gear is not present in the valve actuator, then output mechanism of any applicable prime mover may also suffice.

In the example of FIG. 1, the mechanisms for attachment to a valve may be a valve stem nut and associated supporting structures, as are known in the art. However, any mechanism for attachment known in the art may be utilized. The term "valve" as used herein encompasses the most generic uses of the term as used in the art, including the definition of a device, assembly, or system that at least partially controls the flow of a liquid, gas, and/or solid. Electric motor 104 may be any electrically driven prime mover capable of operating a valve actuator.

The valve actuator 100, when running, may move the valve at or near its rated design speed (e.g., which may be the actuator's full speed) until the motor 104 is de-energized. When moving a valve to its closed position the actuator 100 will move at its rated speed until the valve reaches its closed position (e.g., a seat position), whereby the output torque produced by the actuator 100 increases. If the torque level reaches a predetermined trip level, the motor 104 may be de-energized. Such a torque seating method of closing a valve may secure a valve in the closed position terminating the process flow. In other embodiments, other elements of the valve system may be monitored to determine when the valve reaches the closed position. For example, a control system (e.g., control system 106, discussed below) may monitor the position of a valve element, the position of a shaft of the valve, one or more characteristics of the valve actuator (e.g., power consumption, a current level supplied to the motor, a position of the motor, heat output of the motor, etc.), one or more characteristics of the valve (e.g., a characteristic of flow or pressure in or through the valve), or combinations thereof FIG. 1 also illustrates an exemplary control system 106 for the valve actuator 100. For example, the control system 106 may include a control module 108 for controlling electric motor 104, and depicts electronics 115 for receiving inputs from an interface (e.g., control panel 107) and for sending outputs to indicator 112. In this particular example, indicator 112 is illustrated as a liquid crystal display (LCD). One or more indicators 112 may be present. A few non-limiting examples of indicators include light-emitting diode lights (LED) and displays, filament lights, and dials.

The control system 106 may also include one or more sensors for determining positions of portion of the valve (e.g., a valve element, which provides a physical barrier to the flow in a closed position and enables flow in an open position). For example, the control system 106 may include an encoder 109, which is depicted as a multi-wheel absolute encoder in FIG. 1. In other embodiments, the encoder 109 may comprise a different type of encoder such as, for example, a single wheel absolute encoder, an incremental encoder, etc. Other type of position sensors may be utilized, such as, for example, magnetic sensors, inductive sensors, capacitive sensors, etc.

In some embodiments, the control panel 107 may be part of the control system 106. In other embodiments, the control panel 107 may be formed separate from and remotely communicate with the control system 106 (e.g., where the control system 106 is located remote from the actuator 100). In any instance, the control system 106 and/or the control panel 107 may provide user instructions and/or automated instructions (e.g., in the form of executed coded instructions) that may operate the valve actuator and/or other portions of the valve assembly or system.

Figure 2:
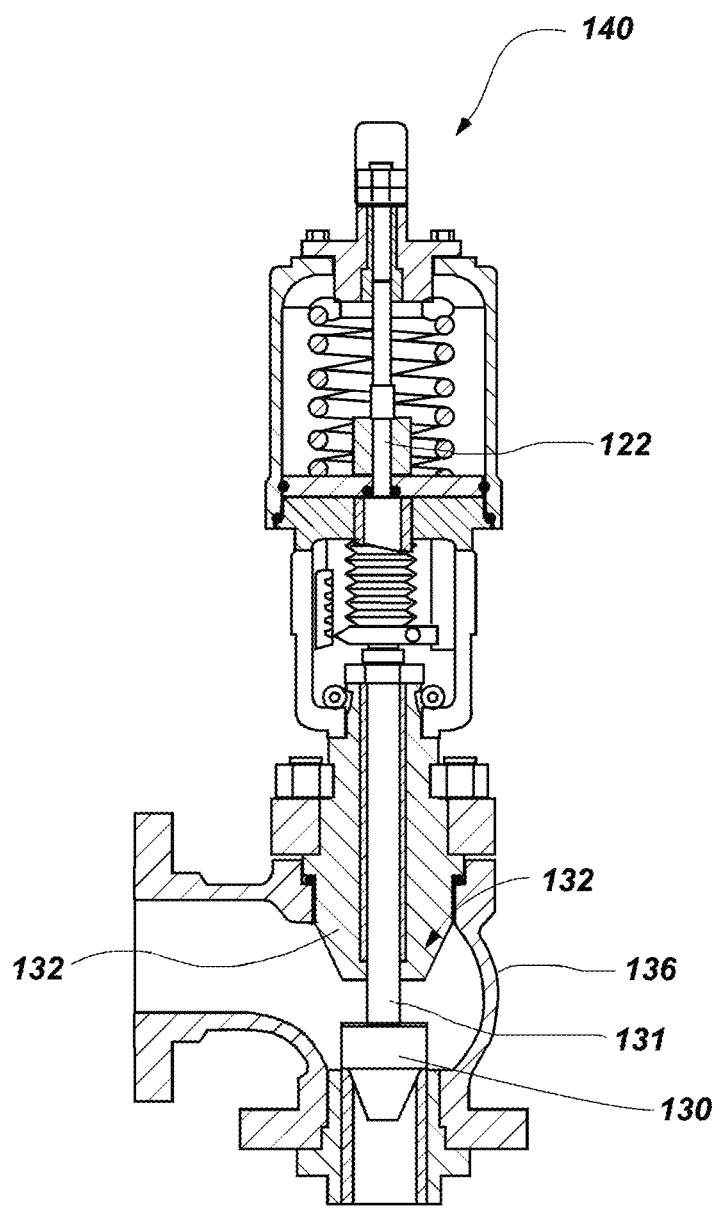
FIG. 2 is cross-sectional view of a pneumatically driven valve actuator.

The present disclosure is not limited to any particular valve actuator and may be applied to any valve actuator. FIG. 2 illustrates a pneumatically driven valve actuator, valve actuator 140, as known in the art. Valve actuator 140 is shown mated to valve 136 and actuator stem 122 is coupled to valve element 132 (e.g., shaft 131 and plug 130). As noted above, referring to both FIGS. 1 and 2, the control system 106 of the actuator 100, 140 may include position sensing features that may monitor position of positions of the valve 136, such as, for example, one or more positions of the valve element 132 (e.g., the plug 130 and/or its associate shaft 131).

The movement of the actuator stem 122 results in corresponding movement of shaft 131 and plug 130, which governs the operation of valve 136. Valve 136 may be a globe, gate, ball, butterfly, plug, diaphragm, or any other type of valve operable by an actuator. Actuator stem 122, shaft 131, and plug 130 are illustrated for a representative globe valve. However, it should be understood that either component may be modified depending upon the type of valve present. Additionally, when the phrase "drive train" is used hereinafter, the phrase encompasses the drive components of valve actuator 140, such as actuator stem 122.

Valve actuator 140 may also include a control system similar to the control system 106 as shown and described above with reference to FIG. 1.

Embodiments of methods, devices, apparatus, and systems of the present disclosure may be utilized to operate a valve actuator and to monitor and control such operation. For example, the embodiments of the present disclosure may be used to operate a control system of a valve actuator while monitoring at least one parameter or characteristic of a valve system in order to periodically alter one or more operations of the valve actuator.

Embodiments of the present disclosure may include control systems for the valve actuators such as, for example, an internal control system or external (e.g., remote) control system of a valve actuator.

Embodiments of the present disclosure may relate to electric valve actuation, which includes changing (e.g., with an electrically-powered motor) a valve position to obtain a desired process flow. As noted above, other types of valve actuation may be implemented.

The control system may instruct the valve actuator to open a valve from a closed and/or seated position to a mid-travel position within the limits of travel may initiate a process flow. Conversely, a valve actuator may move a valve to the closed or seated position terminating a process flow. Additionally, a valve can be moved from one mid-travel position to another mid-travel position increasing or decreasing the process flow as required.

During a closing or seating event, as the valve begins to make contact with the valve body (e.g., a seating surface), the resistance to further movement of the valve may be restricted due to a hard stop and/or from other conditions in the valve, such as, fluid flow. This may result in a rapid rise in torque that is required from the valve actuator to close the valve. For example, this torque gradient may be so steep (e.g., over milliseconds of time) that the final torque applied to the valve by the actuator will exceed the torque trip level of the actuator. In such a scenario, the actuator may not be able to react fast enough to limit the torque level (e.g., to cease operation), which may result in accelerated valve wear that will drive maintenance cycles and/or reduced valve service life.

Further, depending on the process dynamics, such a torque seating method can create a rapid reduction in process flows through the valve, which may generate process control transients that may disrupt other process control elements in the flow process loop. Further still, if the torque gradient is severe enough, failure of the valve and associated piping may result.

Figure 3:
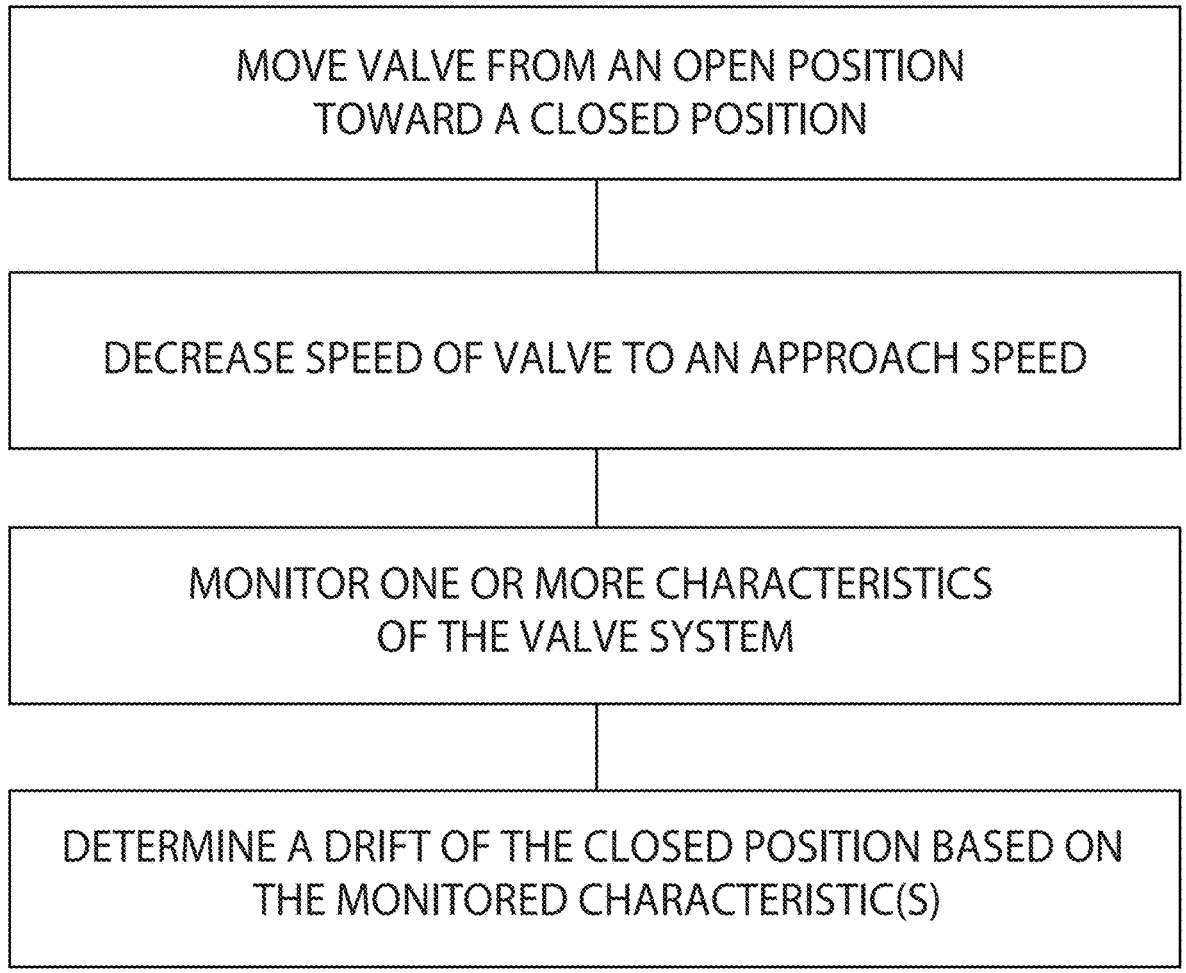
FIG. 3 is a chart illustrating a method of operating a control system of a valve actuator in accordance with an embodiment of the present disclosure.

FIG. 3 is a chart illustrating a method of operating a control system (e.g., control system 106) of a valve actuator (e.g., valve actuator 100). As shown in FIG. 3, in an act, the control system instructs the valve actuator to move the valve from an open position (e.g., a fully open position, a partially open position) toward (e.g., to) a closed position.

In some embodiments, the open position may be unobstructed. For example, the open position may lack a hard stop or back stop that would prohibit further movement of the valve element past a certain open position. In other words, the control system may move the valve element in a direction away from the closed position to an open position where the valve element is capable of moving past the open position in the direction away from the closed position. In the case of rotating valve element, it should be noted that as the valve element moves away form the closed position in one direction (e.g., along one arcuate path), the valve element may be moving relatively closer to the closed position in another direction (e.g., along another arcuate path).

In some embodiments, a closed or seated position may include positioning the valve element at a hard seat that is substantially immovable relative to the movable valve element of the valve (e.g., by initially contacting the seat and then forcing the valve element into the seat with the actuator). For example, the valve may comprise a butterfly valve that contacts a hard stop and then is forced into the hard stop in a closed position where the seats (e.g., metal or polymer seals) define a substantial barrier to fluid flow through the valve. In other embodiments, a closed or seated position may include positioning the valve element into a position or seat where further movement of the valve element is substantially unrestrained. For example, the valve may comprise a ball valve that is positioned in a select orientation in a closed position where the seats (e.g., metal or polymer seals) define a substantial barrier to fluid flow through the valve. However, in such an embodiment, the valve element may be moved beyond the closed or seated position.

Figure 4:
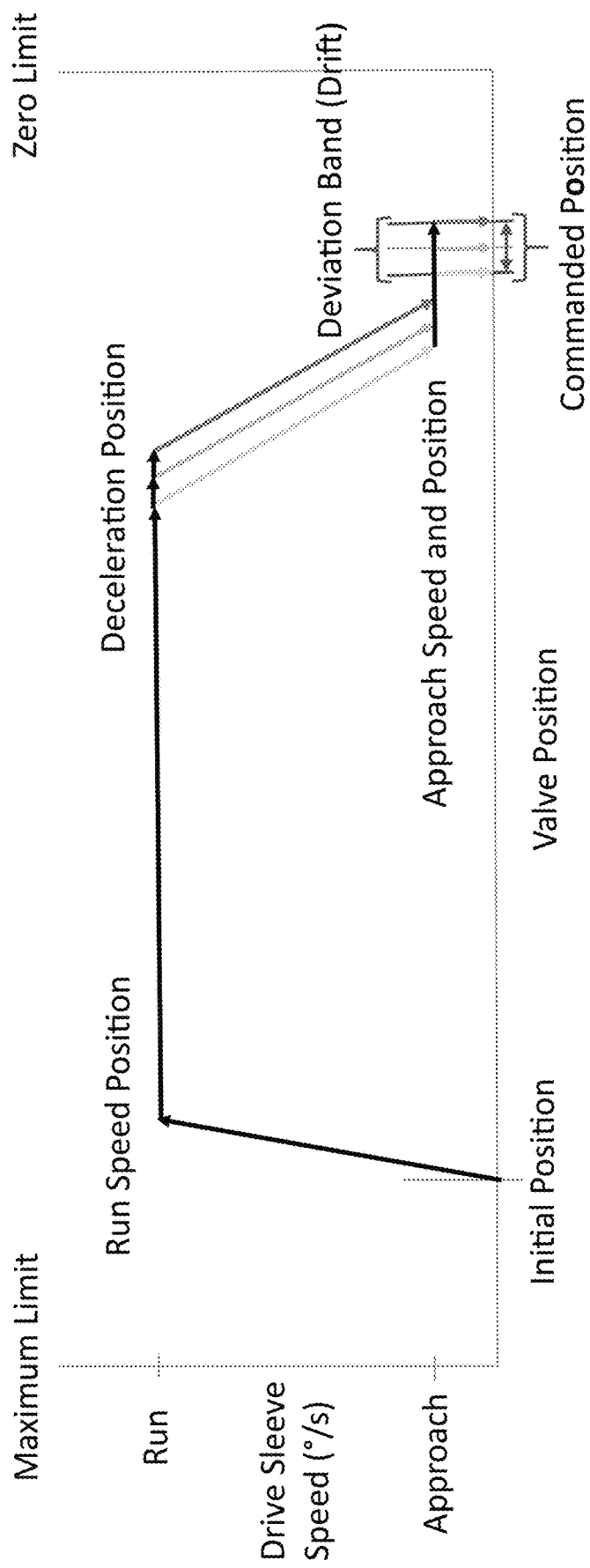
FIG. 4 shows an example graph indicating profiles of movement of the valve in accordance with an embodiment of the present disclosure.

FIG. 4 shows an example graph indicating profiles of movement of the valve between an initial position (e.g., an open position, a closed position, variations therebetween) and a commanded or target position into which the valve actuator is going to move the valve element (e.g., an open position, a closed position, variations therebetween). By the way of example, moving the valve element from an open position to a closed position is discussed below. However, in other implementations, the valve element may be moved between two open positions, from a closed position to an open position, etc. As further discussed below, the commanded position may relate to characteristic of the valve. For example, a characteristic of fluid flow, such as, flow rate, pressure, and/or pressure differential may be stipulated and the control system may move the valve element until such a condition is substantially achieved at a corresponding position. In some embodiments, using known parameter of the valve, the control system may make an initial calculation to predict an approximate position in which such a characteristic may be achieved.

Referring to FIGS. 3 and 4, the control system instructs the valve actuator to move the valve (e.g., the valve element) from an open position toward a closed position. The valve actuator may accelerate the valve element to a run speed (e.g., which may be a partial, full, or a maximum speed of the motor of the actuator). In some embodiments, the control system may calculate and/or monitor the acceleration of the valve element as it is ramped up to the run speed (e.g., by monitoring the time taken to reach the run speed from a stationary position).

After maintaining the run speed for a period of time (e.g., where the position, such as, the angular position, may be monitored by the control system), the control system may begin to decelerate the valve element. As depicted, such an act may commence at a determined deceleration position. In some embodiments, the determined deceleration position may be calculated (e.g., based upon speed), directly sensed (e.g., by sensing position of the valve element by an encoder or other position sensor), combinations thereof, etc.

Once arriving at the deceleration position, the speed of the valve element may be reduced to the valve seat approach speed (e.g., to perform a soft close of the valve element). As discussed above, a closed or seated position may include positioning the valve element at a hard seat that is substantially immovable relative to the movable valve element of the valve or positioning the valve element into a position or seat where further movement of the valve element is substantially unrestrained.

The actuator may maintain this approach speed until the valve is substantially closed (e.g. entirely closed). A closed valve may be determined as discussed above, for example, by a valve element position (e.g., as measured by an output shaft encoder), by seat torque as measured by the actuator, by monitoring one or more characteristics of the valve (e.g., a current supplied to the motor, flow or pressure through the valve), or combinations thereof.

In some embodiments, the control system may monitor a first characteristic of the valve (e.g., position of the valve element, position of a shaft of the valve or actuator) as the valve element is moving along a path toward the closed position (e.g., along the path where the valve element is traveling at the run speed and/or a portion of the path at the approach speed). At a location along the path, the control system may switch to monitoring another characteristic of the valve (e.g., one or more of a torque or a current of the valve actuator) as the valve element approaches and reaches the closed position along the path (e.g., along the path where the valve element is traveling at the approach speed).

In some embodiments, the control system may calculate and/or monitor the deceleration of the valve element as it is reduced to the approach speed from the run speed. For example, the control system may monitor the time taken to reach the approach speed from the run speed (e.g., the time taken to travel from the deceleration position to the approach position).

Over time, the valve closed position may drift from the closed position that is initially or previously configured into the actuator (e.g., through direct input by a user, through sensing a closed position, etc.). In some embodiments, such drift may occur though wear of one or more components of the valve (e.g., wear experienced by the valve element, the seating surfaces, etc.) and/or through material buildup on one or more components of the valve (e.g., buildup on the valve element, the seating surfaces, etc.). In some embodiments, as such wear accumulates over time, the actual closed position may drift moving further away from the open position extending the actuator travel distance to the closed position. In some embodiments, material may build up on the valve, for example, as precipitants of the process flow, oxidation of valve material interaction with process, etc. In this and other embodiments, the valve close position may be closer to the open position reducing the valve travel.

Regardless of the direction and/or magnitude of the drift, the control system may monitor deviation from the initial valve closed position, which may indicate change from the originally configured operating condition. Such deviation may be calculated at intervals or each time the valve element is moved to a closed position. The control system may sense (e.g., via a position sensor) the new or deviated position of the valve element in the closed position and record the new position. The drift or deviation may be calculated by comparing (e.g., calculating the difference between) the initial position and the new or present closed position.

As depicted in FIG. 4, once the new closed position is determined, the control system may then adjust the profile utilized in closing and, in some embodiments, opening the valve. For example, as depicted in FIG. 4, a baseline profile (e.g., the centerline in the deviation band) may altered to the left of the graph (e.g., when the valve seat has drifted relatively closer to the open position) or to the right (e.g., when the valve seat has drifted relatively further away from the open position).

By way of further example, through an adaptive control algorithm, the control system may utilize the newly sensed seated or closed position of the valve element (e.g., the measured deviation/drift of the closed or seated position) to dynamically adjust (e.g., to recalculate based on baseline parameters in the control system) one or more of the deceleration position and the approach speed position.

As depicted in FIG. 4, while the control system may dynamically update drift of a seated or closed position, the control system may substantially maintain (e.g., entirely maintain) the open position. For example, the control system may dynamically alter the distance between the open and closed positions while substantially maintaining the position of the predetermined open position.

In other embodiments, the control system may alter the open position relative to the change of the closed position. In yet other embodiments, the control system may dynamically alter the position of the open position based on one or more values monitored by the control system. For example, the control system may alter one or more of a characteristic of fluid flow through the valve (e.g., pressure in the flow, flow rate, flow regime, such as laminar, turbulent, or variations therebetween). In response to such a sensed or monitored value, the control system may actively adjust the open position until an acceptable value is obtained (e.g., a value in a set range stored in the control system).

In some embodiments, as the drift exceeds a certain set point (e.g., a predetermined deviation band), a message and/or alarm may be generated to inform maintenance and operations of the drift, optionally with an indication of which direction the drift is occurring. Such an alarm message can also include possible causes of such deviation and suggested actions.

Use of such an adaptive speed position profile control algorithm may act to mitigate many of the problems noted above in a seating event. In some embodiments, changing the valve seating approach speed characteristic is one method to reduce/eliminate at least some of the unwanted characteristics in moving a valve between positions (e.g., as discussed above). For example, reducing the valve closing speed prior to valve seating may greatly enhance the ability to control the seating event, thereby, yielding a less aggressive torque gradient, reduced peak torque overshoot, reduced valve wear, and reduction in process flow disruptions.

In some embodiments, such application of a motor control technology with closed-loop variable speed and closed-loop torque control (e.g., control of power or current to the motor) may implement soft seating of the valve along with adaptive control enabling the control system to dynamically monitor and update various positions of the valve, such as, the closed and open positions. In some embodiments, a control system for the valve actuator may implement motor control technology such as, for example, a direct current (DC) motor drive or an alternating current (AC) variable frequency drive with field oriented control. The control system may further include one or more sensors for monitoring actuator output shaft position (e.g., an encoder or other position sensor) and one or more sensors for measuring an output and/or input related to components of the actuator, such as, for example, an output shaft torque (e.g., via motor current or torque-force sensing device), power consumption (e.g., current) and/or operating temperature of the motor. Implementing an algorithm to command a reduction in approach to seat speed as the position of the valve approaches the seat position may create a smoother controlled transition to the seated position. Once at the seated position, the algorithm transitions from a closed-loop speed-position mode to a closed-loop torque control mode, increasing the actuator torque output to the desired final torque level. The motor is then de-energized and the valve is now securely seated in the closed position.

In some embodiments, such monitoring of the torque with the control system may indicate if a valve is wearing out or sticking. Further, trending patterns in the torque measurements may enable predictive maintenance.

As discussed above, in some embodiments, the control system may be utilized in a somewhat similar manner to that shown in FIGS. 3 and 4, to move a valve element between one or more positions where there is no physical hard-stop to the movement (e.g., rotational movement) of the valve element. Such a configuring also lacks a hard-seated position and associated torque ramp-up and torque trip-out at the end of travel as described above. Such a valve configuration (e.g., a modulating control valve) may have physical locations and geometries where flow may be shutoff, full open, and/or throttled in between open and shutoff or closed positioned defining differing operating ranges.

In the instance of a modulating control valve, such a valve may be used to accurately adjust a process flow or pressure. The fluid flow can be measured directly by a flow sensor or by measuring the differential pressure across the valve.

Figure 5:
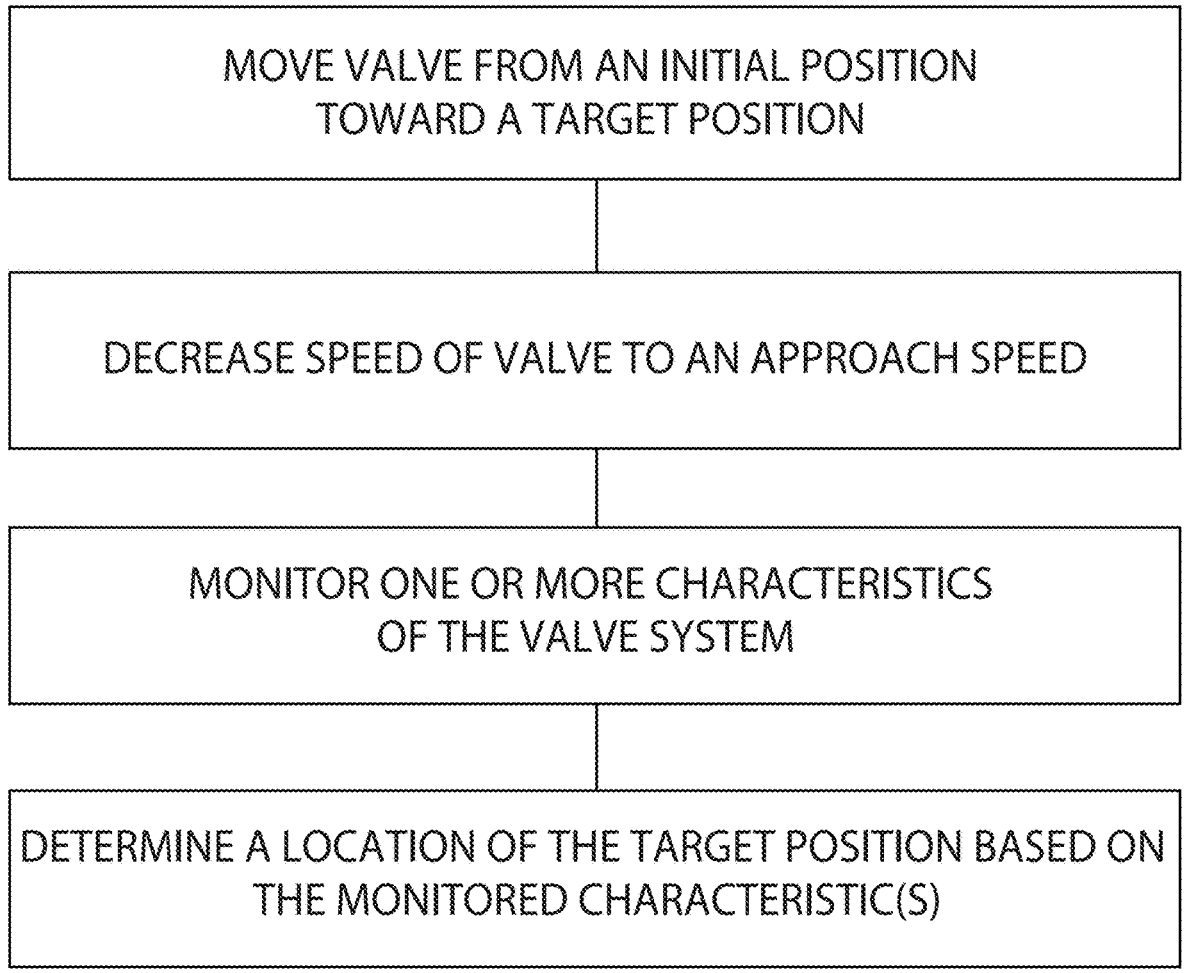
FIG. 5 is another chart illustrating a method of operating a control system of a valve actuator in accordance with an embodiment of the present disclosure.

FIG. 5 is chart illustrating a method of operating a control system of a valve actuator, for example, where the positions are unobstructed (e.g., lack a hard stop). As noted above, such position may include combinations of multiple open positions of the valve element and a closed or seat position lacking a hard stop.

Referring to FIGS. 4 and 5, when moving a valve to a commanded or target position lacking an associated hard stop, the actuator will move at its rated speed until the valve reaches the commanded position, where the motor is de-energized and the motion stops. However, the actuator has likely overshot the commanded position triggering a correction in the form of a movement in the opposite direction. As this correction is generally a relatively small movement, the duration that the motor is energized is also small, perhaps even just a quick pulse. It is further likely the actuator will again overshoot and initiate a correction in the original direction. Such hunting/oscillation will continue until the error between the commanded position and actual position falls within the control loop's deadband parameter (e.g., a range where the position error is small enough that no further action required). If the deadband parameter is not set correctly (or another gain parameter), the oscillation could continue indefinitely resulting in reduced actuator life and creating process disturbances in the flow loop. In some instances, the actuator may over heat (e.g., thermally trip) de-activating the actuator for a period of time for cool down where the process is temporarily not actively controlled.

Implementing a closed-loop process algorithm as discussed above to regulate a reduction in approach speed as the valve approaches the commanded position, flow rate, and/or desired pressure may generate a smooth controlled transition from movement to a stop. Overshoot and hunting/oscillation about the desired process parameter may be reduced or eliminated enabling for faster process start-up, less wear on the actuator and valve, and greater process stability.

Referring to FIGS. 4 and 5, the drift may be characterized as process error where such error is a function of the difference between a set process variable (e.g., position, flow, and/or pressure) and a process set point for that process variable. The characteristics of this operational profile may be parameterized by the operator, or, dynamically calculated (e.g., learned) with the implementation of an auto-tuning algorithm. The later offers a dynamic update to control operation and/or characteristics of the valve ensuring optimized performance through the operating envelope. The dynamic update may also adjust for changing environmental conditions, flow materials, and/or equipment wear, all of which may impact the actuator operation and process stability.

The valve actuator performance may be benchmarked utilizing one or more initial valve positions to establish the desired process characteristics. Over time, wear/buildup on the valve may cause these one or more positions to change and the control system may update these positions to generate substantially the same process characteristic. As the one or more positions drift from the benchmarked position (s), an alarm may be generated once the drift exceeds an operator defined deviation band. Such an alarm may inform operators and maintenance resources of the changing system performance which may be an indication of eroding system health and potential system failure.

In some embodiments, the control system may monitor one or more characteristics of valve (e.g., a torque profile) as compared to a baseline scenario. As discussed above, the valve actuator may be fitted with a torque limiting apparatus. This apparatus may cause the motor to be de-energized if the torque generated by the actuator exceeds the torque set with the limiting technology. Replacing or supplementing the torque limiting technology with a dynamic direct torque measurement technology may enable the actuator to monitor the torque generated throughout the valve movement. The torque profile may be benchmarked and the torque profile of subsequent valve movements can be monitored and compared to the torque profile baseline.

As the actuator and valve wear and/or as the environmental and/or operating conditions change, deviations between the actual measured torque profile and the benchmark torque profile will increase. As these deviations begin to exceed deviation limits, an action (e.g., one or more alarms may be generated to alert operators and maintenance resources of the changing operating dynamic of the system indicating possible deterioration of the health of the system. In some embodiments, analysis of the evolving torque profile may be utilized to suggest problem areas in the system to investigate as the root cause of the deviation.

In some embodiments, the control system may monitor one or more thermal values in the valve system. For example, as the actuator moves the valve, the prime mover of the system is the electric motor in the actuator, which will generate heat energy during operation. The rate of thermal rise may be determined, in part, by one or more of (1) the number of moves per unit time, (2) the load on the motor (e.g., the torque required to move the valve at the commanded speed), (3) ambient temperature, and (4) construction, thermal rating, and heat dissipation design of the electric motor.

For example, running the motor many times with a high load at the maximum speed in a very warm environment will result a high thermal rise (e.g., increase in temperature). Such a scenario may limit how much the actuator may be used to move the valve as components of the actuator have an operational temperature rating in their design specifications. Driving the equipment beyond these thermal ratings may seriously deteriorate this equipment, or worse, cause them to fail. Generally, if the actuator exceeds the rated motor operating temperature, the actuator is stopped to dissipate the heat until the temperature returns to the operating range.

In some embodiments, as actuator installations may include mission critical applications, stopping an actuator to cool may not be acceptable.

In some embodiments, the control system may monitor the current temperature and/or the rate at which the motor temperature is rising. The control system may predict, based on the actual motor temperature and/or rate of change, when the actual motor temperature will exceed the temperature specification. In such a scenario, the adaptive control algorithm may slow the speed of the motor, thereby, reducing the thermal rate and enabling the actuator to continue operating within specification operation. While this action may not entirely prevent the actual motor temperature from eventually exceeding specification, such throttling of the motor will extend the operating window for the actuator.

As the rate of thermal rise is decreased, the throttling may be reduced until the motor temperature begins to rise again or full operational capability is restored.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents of the claims that follow.

What is claimed is:

1. A valve system comprising:
    a valve actuator for controlling a position of a valve element in a valve in order to control flow through at least a portion of the valve; and
    a control system for controlling the valve actuator, the control system configured to:
        instruct the valve actuator to move the valve element toward an unobstructed first position in the valve to enable fluid flow through the at least a portion of the valve;
        instruct the valve actuator to move the valve element from the unobstructed first position to a second closed position in the valve to reduce the fluid flow through the at least a portion of the valve, wherein the valve element is at least partially seated to reduce the fluid flow in the valve in the second closed position;
        monitor at least one characteristic of the valve system during movement of the valve element to the second closed position comprising a hard stop;
        determine a drift of a sensed location of the second closed position based on the monitored at least one characteristic of the valve system by calculating a difference between a previously recorded closed position and the second closed position; and
        during each movement of the valve element, maintain a predetermined location of the unobstructed first position while actively adjusting the location of the second closed position comprising the hard stop each time the drift in the sensed location of the second closed position is detected.

2. The valve system of claim 1, wherein the control system is further configured to:
    reduce a rate of speed of the valve element as the valve element travels to the second closed position at a selected point; and
    update the selected point for the reducing of the speed of the valve element based on the determined drift of the second closed position.

3. The valve system of claim 1, wherein the control system is further configured to at least one of:
    determine that the second closed position of the valve element has drifted to a location relatively closer to the first position; or
    determine that the second closed position of the valve element has drifted to a location relatively further away from the first position.

4. The valve system of claim 1, wherein the control system is further configured to update a deacceleration point based on the determined drift.

5. The valve system of claim 1, wherein the control system is further configured to, at a predetermined location along a path of the valve element, switch to monitoring another characteristic of the valve system that is distinct from the at least one characteristic as the valve element approaches and reaches the second closed position along the path.

6. The valve system of claim 1, wherein the at least one characteristic comprises at least one of torque of the valve actuator, current of the valve actuator, rate of flow through the valve, flow type through the valve, position of the valve element, or a pressure in the valve.

7. The valve system of claim 1, wherein the control system is further configured to monitor at least another characteristic of the valve system during movement of the valve element back to the first position.

8. The valve system of claim 7, wherein the at least another characteristic comprises at least one of flow through the valve, flow type through the valve, position of the valve element, or a pressure in the valve.

9. The valve system of claim 1, wherein the unobstructed first position comprises a position of the valve element that lacks a hard stop, and wherein the second closed position comprises a hard stop.

10. The valve system of claim 1, wherein the control system is further configured to:
update a location of the second closed position based on the detected drift; and
update a location of a change in speed of the valve element based on the detected drift.

11. The valve system of claim 1, wherein the control system is further configured to generate an alarm or alert when the drift is outside of a selected range of drift values.

12. The valve system of claim 1, wherein the second closed position comprises a closed seated position, and wherein the control system is configured to move the valve element into contact with a seat of the valve system and then to force the valve element into the seat until a selected value of torque in the valve actuator is reached.

13. A valve system comprising:
a valve actuator for controlling fluid flow through at least a portion of a valve with a valve element; and
a control system for controlling the valve actuator, the control system configured to:
instruct the valve actuator to move the valve element to a target position from an initial position in the valve to reduce or increase fluid flow through the at least a portion of the valve, the initial position being an unobstructed position;
monitor at least one characteristic of the valve system during movement of the valve element to the target position;
detect a location of the target position based on the monitored at least one characteristic of the valve system; and
during each movement of the valve element, the control system being further configured to at least one of:
move the valve element into contact with a seat of the valve system in the target position and then to force the valve element into the seat until a selected value of torque in the valve actuator is reached; or
maintain a predetermined location of the initial position while actively adjusting the location of the target position based on the monitored at least one characteristic of the valve system each time the valve element is moved to the target position.

14. The valve system of claim 13, wherein the control system is configured to monitor a torque of the valve actuator as the valve element is positioned at the target position.

15. A method of operating a control system of a valve actuator, the method comprising:
moving a valve element with the valve actuator to a closed position to substantially inhibit fluid flow through at least a portion of a valve;
determining a drift of the closed position based on the monitored at least one characteristic of the valve system; and
at least one of:
moving the valve element into contact with a seat of the valve system in the closed position and then forcing the valve element into the seat until a selected value of torque in the valve actuator is reached; or
maintaining a predetermined location of the open position lacking a hard stop in the valve to enable fluid flow through the at least a portion of the valve while actively adjusting the location of the closed position based on a monitored at least one characteristic of the valve system each time the valve element is moved between the open position and the closed position.

16. The method of claim 15, further comprising monitoring at least another characteristic of the valve system during movement of the valve element to the open position.

17. The method of claim 15, further comprising:
monitoring position of the valve element as the valve element is moving along a path toward the closed position; and
at a location along the path, switching to monitoring at least one of a torque or a current of the valve actuator as the valve element approaches and reaches the closed position along the path.

18. The method of claim 15, further comprising:
reducing a rate of speed of the valve element as the valve element travels to the closed position at a selected point; and
update the selected point for the reducing of the speed of the valve element based on the determined drift of the closed position.

19. The method of claim 15, further comprising locating the control system at a location remote from the valve.

* * * * *